United States Patent
Thompson et al.

(10) Patent No.: US 11,762,163 B2
(45) Date of Patent: *Sep. 19, 2023

(54) FIBER OPTIC SPLICE CLOSURE AND ASSEMBLIES

(71) Applicant: COMMSCOPE TECHNOLOGIES LLC, Hickory, NC (US)

(72) Inventors: Roy Keller Thompson, Apex, NC (US); Mark Alan Harvell, Lillington, NC (US); William Alan Carrico, Raleigh, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,701

(22) Filed: Mar. 8, 2022

(65) Prior Publication Data

US 2022/0196957 A1    Jun. 23, 2022

Related U.S. Application Data

(63) Continuation of application No. 17/533,900, filed on Nov. 23, 2021, which is a continuation of application No. 16/621,166, filed as application No. PCT/US2018/037295 on Jun. 13, 2018, now Pat. No. 11,194,111.

(60) Provisional application No. 62/520,209, filed on Jun. 15, 2017.

(51) Int. Cl.
*G02B 6/00* (2006.01)
*G02B 6/44* (2006.01)

(52) U.S. Cl.
CPC ........ *G02B 6/4455* (2013.01); *G02B 6/4444* (2013.01); *G02B 6/4452* (2013.01)

(58) Field of Classification Search
CPC .. G02B 6/4455; G02B 6/4444; G02B 6/4452; G02B 6/4454; G02B 6/00
See application file for complete search history.

(56) References Cited

U.S. PATENT DOCUMENTS

| | | | |
|---|---|---|---|
| 5,495,549 | A | 2/1996 | Schneider et al. |
| 5,896,486 | A | 4/1999 | Burek et al. |
| 5,911,027 | A | 6/1999 | Macken et al. |
| 6,304,707 | B1 | 10/2001 | Daems et al. |
| 6,496,640 | B1 | 12/2002 | Harvey et al. |
| 6,504,987 | B1 | 1/2003 | Macken et al. |

(Continued)

FOREIGN PATENT DOCUMENTS

| | | |
|---|---|---|
| CN | 104226885 B | 3/2016 |
| DE | 103 14 262 A | 6/2004 |

(Continued)

OTHER PUBLICATIONS

International Search Report and Written Opinion of the International Searching Authority for International Patent Application No. PCT/US2018/037295 dated Oct. 8, 2018, 14 pages.

*Primary Examiner* — Jennifer Doan
(74) *Attorney, Agent, or Firm* — Merchant & Gould P.C.

(57) ABSTRACT

Fiber optic splice closures adapted to house a large number of fiber splices. The closure holds a splice assembly including a support frame that supports two stacks of splice trays. The splice assembly can be inverted to access the second stack of splice trays. The support frame can also define one or more fiber organizing areas within the splice closure.

19 Claims, 11 Drawing Sheets

(56) References Cited

U.S. PATENT DOCUMENTS

| | | | |
|---|---|---|---|
| 7,113,687 B2 | 9/2006 | Womack et al. | |
| 7,376,325 B1 | 5/2008 | Cloud et al. | |
| 8,180,191 B2 | 5/2012 | Blackwell, Jr. et al. | |
| 8,625,951 B2 | 1/2014 | Pimentel et al. | |
| 10,502,917 B2 * | 12/2019 | Geens | G02B 6/4452 |
| 11,194,111 B2 * | 12/2021 | Thompson | G02B 6/4452 |
| 2003/0123834 A1 | 7/2003 | Burek et al. | |
| 2010/0183274 A1 | 7/2010 | Brunet et al. | |
| 2010/0189404 A1 | 7/2010 | Rudenick et al. | |
| 2011/0097050 A1 | 4/2011 | Blackwell, Jr. et al. | |
| 2012/0230644 A1 | 9/2012 | Marmon et al. | |
| 2013/0315550 A1 | 11/2013 | James et al. | |
| 2014/0044400 A1 | 2/2014 | Anguiano et al. | |
| 2017/0045701 A1 | 2/2017 | Diepstraten et al. | |

FOREIGN PATENT DOCUMENTS

| | | |
|---|---|---|
| EP | 1 109 037 A2 | 6/2001 |
| EP | 1 160 608 A2 | 12/2001 |
| EP | 1 431 793 A2 | 6/2004 |
| EP | 1 843 182 A1 | 10/2007 |
| EP | 2 533 086 B1 | 8/2014 |
| EP | 2 290 418 B1 | 6/2015 |
| EP | 1 921 472 B1 | 3/2017 |
| GB | 2 282 457 A | 4/1995 |
| GB | 2 300 488 A | 11/1996 |
| WO | 95/07480 A1 | 3/1995 |
| WO | 2004/021061 A1 | 3/2004 |
| WO | 2007/033408 A1 | 3/2007 |
| WO | 2007/065540 A1 | 6/2007 |
| WO | 2007/096568 A1 | 8/2007 |
| WO | 2008/078058 A1 | 7/2008 |
| WO | 2009/106874 A1 | 9/2009 |

\* cited by examiner

FIBER OPTIC SPLICE CLOSURE AND ASSEMBLIES

CROSS-REFERENCE TO RELATED APPLICATION

This application is a continuation of U.S. patent application Ser. No. 17/533,900, filed on Nov. 23, 2021, which is a continuation of U.S. patent application Ser. No. 16/621,166, filed on Dec. 10, 2019, now U.S. Pat. No. 11,194,111, which is a National Stage Application of PCT/US2018/037295, filed on Jun. 13, 2018, which claims the benefit of U.S. Patent Application Ser. No. 62/520,209, filed on Jun. 15, 2017, the disclosures of which are incorporated herein by reference in their entireties. To the extent appropriate, a claim of priority is made to each of the above disclosed applications.

BACKGROUND

Fiber optic cables house optical fibers used to carry optical signals to and from telecommunications equipment. Typically, large cables, such as trunk cables, house a large number of fibers. The fibers of the trunk cable are spliced and then routed to a desired destination, (e.g., a building). Due to the large number of fibers being spliced and the need to protect the splice, the trunk cable is often terminated in a fiber optic splice closure. Such fiber optic splice closures typically include an outer ruggedized and sealable shell defining an interior volume and one or more ports for cable access to the interior. The closures can be adapted for outdoor or indoor use. The interior volume of a splice closure typically houses structures and equipment to splice and organize fibers to facilitate both storing of fibers and routing of fibers to their desired destinations.

SUMMARY

In general terms, the present disclosure is directed to a fiber optic splice closure adapted to house a large number of fiber splices.

According to certain aspects of the present disclosure, a fiber optic splice closure includes a first shell piece defining a first shell piece volume and a second shell piece defining a second shell piece volume, the first and second shell pieces adapted to be sealingly coupled together to form a shell defining at least one cable port and an interior splice volume consisting of the first and second shell piece volumes.

According to certain aspects of the present disclosure, an assembly for a fiber optic splice closure includes a support frame, the support frame comprising a main plate having an upper surface and an opposing lower surface, the support frame defining a first fiber organization volume adjacent the upper surface and a second fiber organization volume adjacent the lower surface; a first splice tray stack comprising a plurality of fiber optic splice trays, the first splice tray stack being coupled to the support frame and disposed such that first fiber organization volume is positioned between the upper surface of the main plate and the first splice tray stack; and a second splice tray stack comprising a plurality of fiber optic splice trays, the second splice tray stack being coupled to the support frame and disposed such that the second fiber organization volume is positioned between the lower surface of the main plate and the second splice tray stack.

According to certain aspects of the present disclosure, a cable closure includes a first shell piece defining a first interior volume; and a second shell piece defining a second interior volume, the first and second shell pieces being couplable together to define a sealed closure volume including the first and second interior volumes; a first splice tray stack disposed in the first interior volume; and a second splice tray stack disposed in the second interior volume. In some examples, the cable closure defines at least two cable ports each adapted to receive a portion of at least one cable entering the closure volume. In some examples, a support frame is disposed between the first splice tray stack and the second splice tray stack. In some examples, the support frame includes a plate and defines a first fiber organization volume disposed between a first side of the plate and the first splice tray stack within the first interior volume, and the support frame further defines a second fiber organization volume disposed between a second side of the plate and the second splice tray stack within the second interior volume, the second side being opposite the first side.

According to certain aspects of the present disclosure, a fiber optic splice closure includes a support frame, the support frame comprising a plate having opposing first and second surfaces, a first plurality of legs extending from the first surface in a direction substantially perpendicular to the first surface, and a second plurality of legs extending from the second surface in a direction substantially perpendicular to the second surface, the first plurality of legs and the first surface defining a first fiber organization volume, the second plurality of legs and the second surface defining a second fiber organization volume.

In some examples, the frame further comprises two or more feet, at least one of the feet extending from one of the first plurality of legs, and at least another of the feet extending from one of the second plurality of legs, each of the feet extending substantially parallel to the first and second surface, the one or more feet adapted to support at least one splice tray.

In some examples, a splice tray support structure is securable to the frame, the splice tray support structure being adapted to support a first stack of splice trays on one side of the frame, and a second stack of splice trays on a second side of the frame, the second side being opposite the first side.

In some examples, the splice tray support structure includes a platform and a stem, the stem being received in a slot disposed in the platform and having a first mounting portion and a second mounting portion, the first and second mounting portions being on opposite sides of the slot and each of the first and second mounting portions being adapted to mount a splice tray stack.

In some examples, each splice tray stack includes a spine defining a plurality of sockets, each socket adapted to rotationally receive a pin of a splice tray, the pin and socket forming a hinge adapted to pivot the splice tray relative to the spine.

According to further aspects of the present disclosure, a splice closure assembly includes a fiber optic splice closure comprising a shell defining a plurality of cable ports and an interior splice volume, a support frame disposed in the interior splice volume, the support frame comprising a plate having opposing first and second surfaces, a first plurality of legs extending from the first surface in a direction substantially perpendicular to the first surface, and a second plurality of legs extending from the second surface in a direction substantially perpendicular to the second surface, the first plurality of legs and the first surface defining a first fiber organization volume, the second plurality of legs and the second surface defining a second fiber organization volume, a first stack of splice trays mounted to the support frame and disposed in a portion of the interior splice volume opposite the first surface of the support frame, and a second stack of splice trays mounted to the support frame and disposed in a portion of the interior splice volume opposite the second surface of the support frame. The cable ports can be positioned relative to the support frame such that the cables are approximately equidistant from each of the two splice tray stacks. Such a configuration can reduce the amount of fiber length needed for the fibers to reach a given splice tray.

In some examples, the splice closure assembly includes at least one input cable entering the interior splice volume through a first of the plurality of ports, and at least one output cable exiting the interior splice volume through a second of the plurality of ports, one or more fibers of the at least one output cable being spliced to one or more fibers of the input cable in one or more splice trays of the splice tray stacks. In some examples, due to the placement and orientation of the cables entering the closure relative to the splice tray stacks, the fibers from the cable(s) enter and exit the one or more of the splice trays along a direction that is substantially perpendicular to the axis of the hinge by which the tray is pivotally coupled to the tray stack.

The fibers spliced in accordance with the present disclosure can be individual fibers or sets of coupled fibers, such as ribbonized fibers.

According to further aspects of the present disclosure, a kit for assembling a splice closure assembly comprises: a support frame, the support frame comprising a plate having opposing first and second surfaces, a first plurality of legs extending from the first surface in a direction substantially perpendicular to the first surface, and a second plurality of legs extending from the second surface in a direction substantially perpendicular to the second surface, the frame further comprises two or more feet, at least one of the feet extending from one of the first plurality of legs, and at least another of the feet extending from one of the second plurality of legs, each of the feet extending substantially parallel to the first and second surface; and/or a splice tray support structure securable to the frame, the splice tray support structure comprising a platform and/or a stem and/or one or more fasteners for securing the platform and the stem to the support frame.

According to still further aspects of the present disclosure, a method for splicing a plurality of fibers from a cable comprises: mounting a first stack of splice trays to a first side of a support frame; mounting a second stack of splice trays to a second side of the support frame, the second side being opposite the first side; storing fiber slack in a first fiber organization volume defined on a first side of the support frame; splicing a first subset of the fibers from the cable on one or more of the splice trays in the first stack of splice trays; inverting the support frame; storing fiber slack in a second fiber organization volume defined on a second side of the support frame, the second side being opposing the first side; and splicing a second subset of the fibers from the cable on one or more of the splice trays in the second stack of splice trays.

In some examples, the method further comprises loading the support frame and the mounted splice stacks containing the splices into a closure and sealing the closure.

In some examples, the method further includes securing the cable to the support frame. In some examples, the cable is a first cable, and the splicing is performed to one or more fibers of at least a second cable, the method further comprising securing the first and second cables to the support frame.

In some examples the cable includes N fibers (N being a positive integer), wherein N/2 or approximately N/2 fibers are routed to and spliced on splice trays of the first stack of splice trays and N/2 or approximately N/2 fibers of the N fibers are routed to and spliced on splice trays of the second stack of splice trays. In some examples, N is at least 4,000. In some examples, N is at least 5000. In some examples, N is at least 6,000. In some examples, N is 6,912, with 3,456 fibers spliced on splice trays of the first stack of splice trays and the other 3,456 fibers spliced on splice trays of the second stack of splice trays.

In some examples, the cable is a first cable sealable in a first port of a closure, and the fibers of the first cable are all spliced to fibers of a second cable that is sealable in a second port of the closure, and/or wherein the first port and the second port are disposed on the same side of a plurality of sides of the closure, and/or wherein the first cable and the second cable are both secured to the support frame, and/or wherein longitudinal axes of the first and second cables are substantially perpendicular to a stacking axis of the first and the second stacks of splice trays, and/or wherein the inverting step includes revolving the first and second cables about each other.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1:
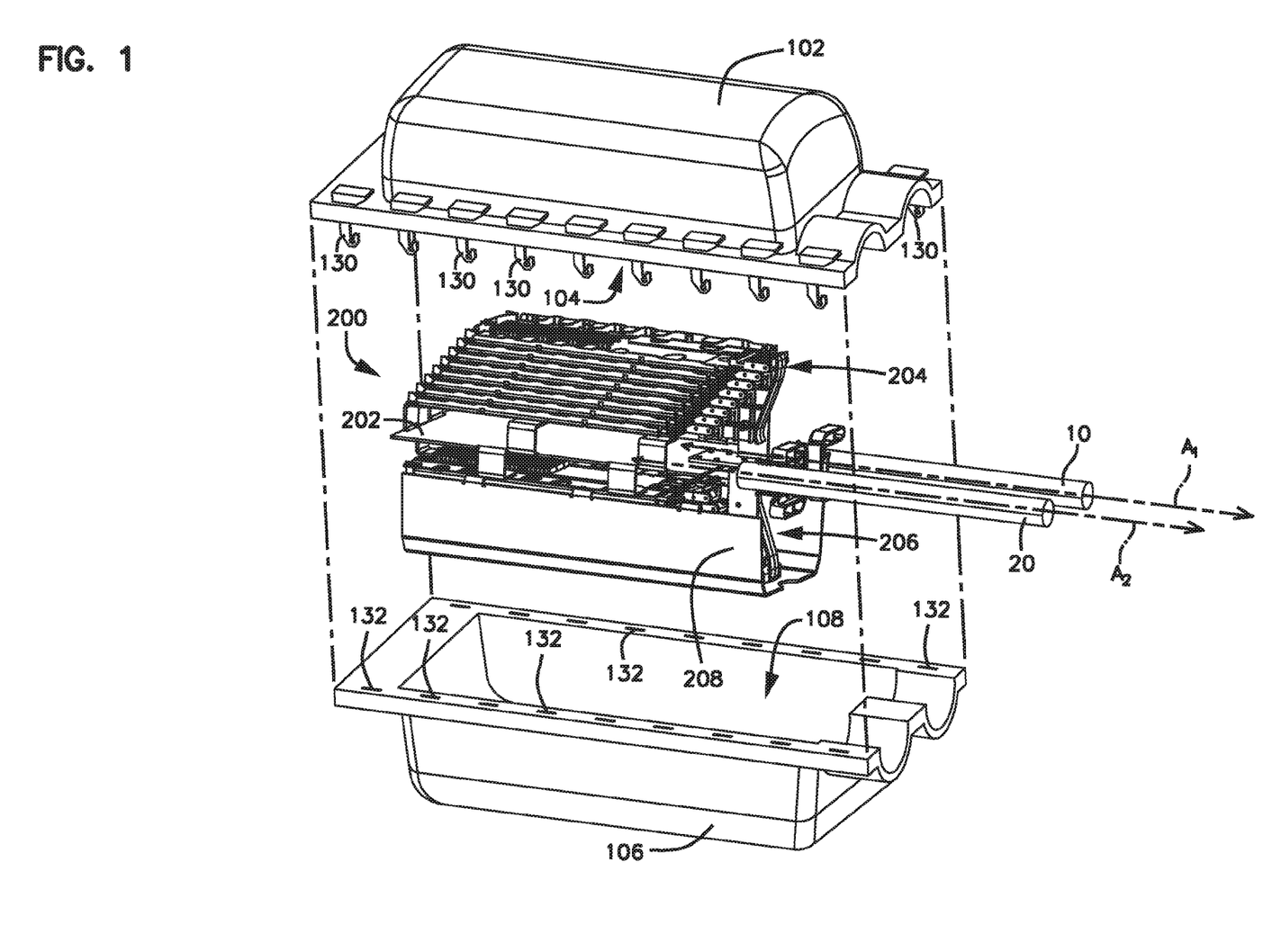
FIG. 1 is a partially exploded perspective view of an example telecommunications closure in accordance with the present disclosure.
Figure 2:
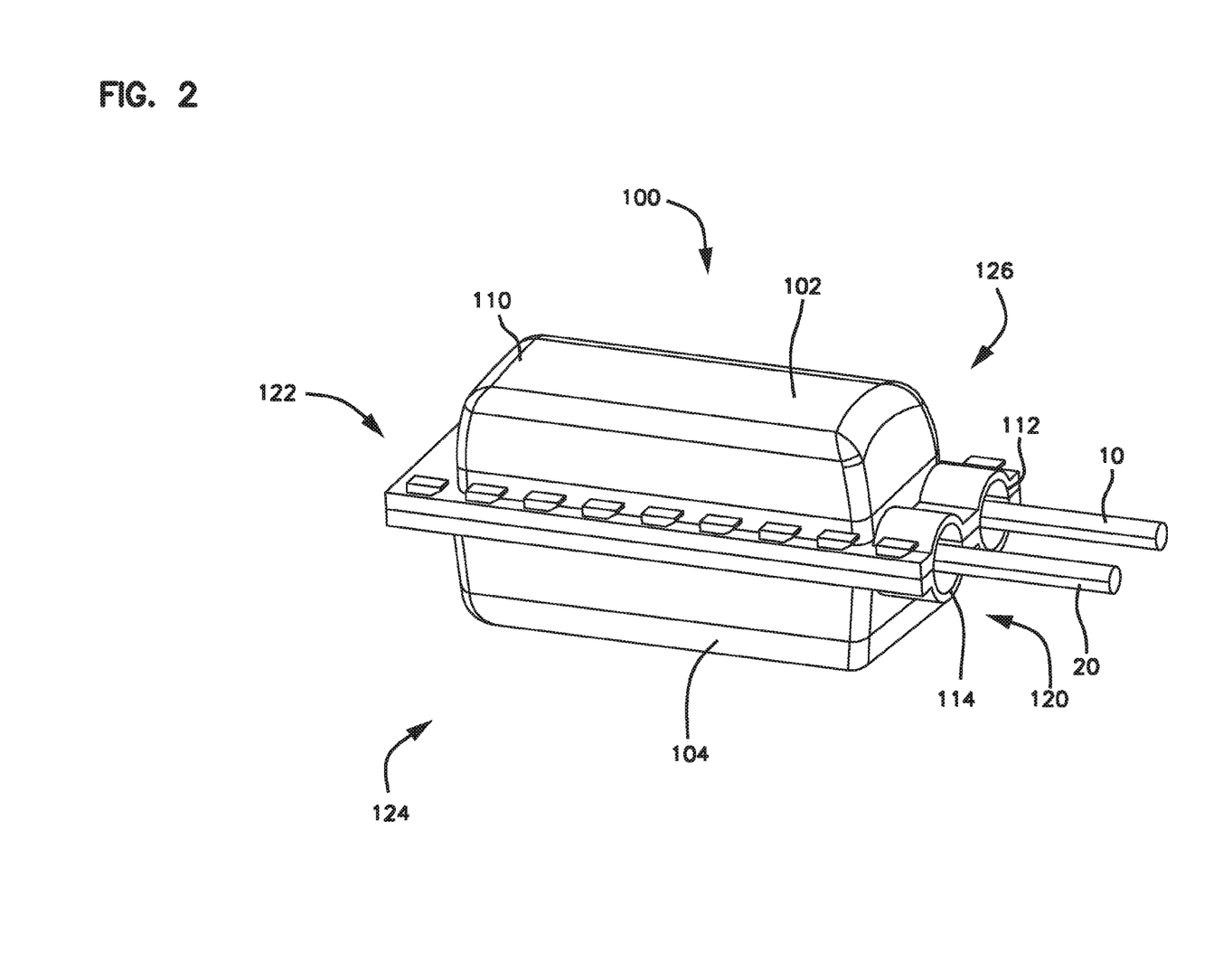
FIG. 2 is a perspective view of the telecommunications closure of FIG. 1 in an assembled configuration.

FIG. 1 is an exploded perspective view of an example telecommunications closure 100 in accordance with the present disclosure. FIG. 2 is a perspective view of the telecommunications closure 100 of FIG. 1 in an assembled configuration.

Referring to FIGS. 1-2, the closure 100 includes a first shell piece 102 defining a first shell piece volume 104 and a second shell piece 106 defining a second shell piece volume 108, the first and second shell pieces 102 and 106 adapted to be sealingly coupled together to form a shell 110 defining cable ports 112 and 114 by which cables 10, 20 enter the splice closure. When assembled, the closure 100 defines an interior splice volume consisting of the first and second shell piece volumes 104, 108. In some examples the first and second shell piece volume 104 and 108 are equal or nearly equal.

In this example, each cable 10, 20 includes an outer jacket housing a plurality of optical fibers. The cables 10, 20 are each defined by their longitudinal axes A1 and A2, respectively. Each cable 10, 20, can include one or more tubes or layers within the jacket to provide protection and/or strength to the cable, and the fibers housed in the cables 10, 20 can include one or more protective layers (e.g., coating, cladding, and/or buffer layers) surrounding the bare fiber(s). The fibers can be individual fibers or sets of coupled fibers, such as ribbonized fibers.

The fibers of one of the cables 10, 20 can be spliced within the closure 100 to corresponding fibers of the other one of the cables 10, 20 for routing optical signals to desired destinations.

Although in the example embodiment shown only two cable ports are provided, it should be appreciated that the shell 110 can define additional cable ports. For example, the fibers of a first cable can be spliced in the closure 100 to fibers of a plurality of discrete cables, each of which can be provided with its own sealable port in the shell 110.

Each of the cables 10, 20, can house a large number of fibers, such as at least 4,000, at least 5,000, at least 6,000, etc. In one particular example, each cable 10, 20 houses 6,912 fibers ribbonized in 576 ribbonized cables each containing 12 fibers. However, it should be appreciated that the cables 10, 20 can alternatively house fewer fibers, or any suitable number of fibers for splicing within the closure 100.

The shell 110 has a plurality of sides 120, 122, 124, 126. In this example, the ports are disposed in the same side 120 of the closure 100. In alternative examples, one or more ports can be disposed in other sides of the shell 110.

The shell 110 can be made of a ruggedized, weather resistant material. First complementary coupling components (e.g., the latches 130) on one of the shell pieces 102 can be adapted to lockingly mate with corresponding coupling components (e.g., the slots 132) of the other shell piece 106 to assemble the shell 110. A seal, e.g., a gel seal, can be provided between the shell pieces, and additional seals can be provided in the ports 112, 114 surrounding the cables 10, 20 to effectively seal off the interior splice volume from the environment exterior to the closure 100.

The closure 100 also includes a splice assembly 200 removably housed in the interior splice volume defined by the shell 110. The splice assembly 200 includes a support frame 202, and first and second splice tray stacks 204 and 206. Optionally, the splice assembly 200 can be supported in a trough 208 that also fits inside the interior splice volume defined by the shell 110. When the closure 100 is assembled, one of the splice tray stacks 204 is disposed substantially or entirely within the first shell piece volume 104 or the second shell piece volume 108, while the other of the splice tray stacks 206 is disposed substantially or entirely within the other of the first shell piece volume 104 and the second shell piece volume 108.

Figure 3:
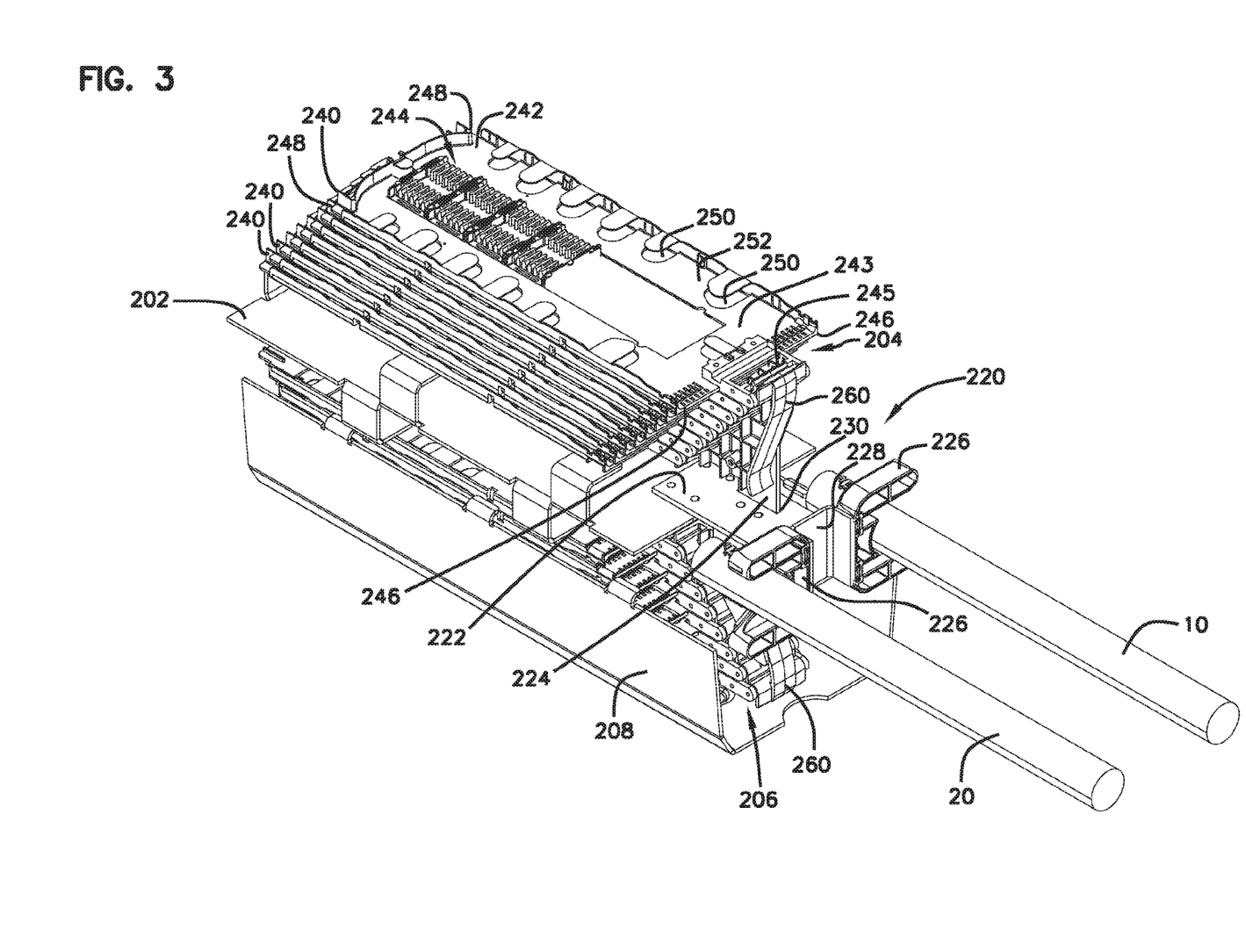
FIG. 3 is a perspective view of the splice assembly of FIG. 1 including an example attachment subassembly.
Figure 4:
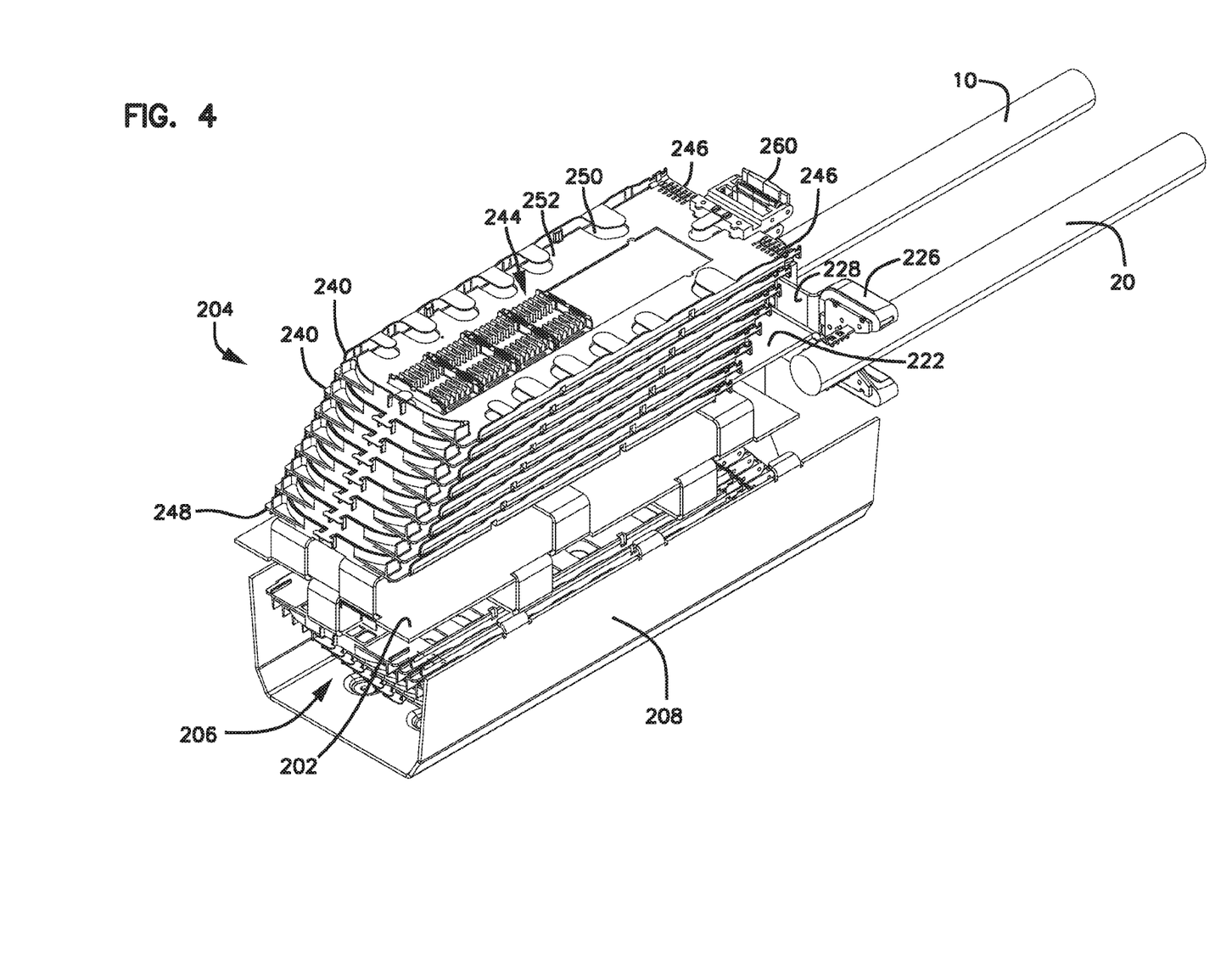
FIG. 4 is a further perspective view of the splice assembly of FIG. 1.

FIG. 3 is a perspective view of the splice assembly 200 of FIG. 1. FIG. 4 is a further perspective view of the splice assembly 200 of FIG. 1.

Referring to FIGS. 3 and 4, an attachment subassembly 220 mounts the cables 10, 20 and the first and second splice tray stacks 204, 206 to the support frame 202. In this example, the subassembly 220 includes a platform 222, a stem 224, a pair of cable brackets 226, and a bridge 228. The bridge 228 connects the brackets 226 to each other, and mounts the brackets 226 to the platform 222. The platform 222 is coupled to the support frame 202 and supports the stem 224, the step passing through a slot 230 in the platform 222. The stem 224 mounts the first and second splice tray stacks 204 and 206, and thereby couples the splice tray stacks 204 and 206 to the support frame 202. Each of the brackets 226 partially surrounds, grips, and secures a portion of one of the cables 10, 20. The brackets 226 are mounted to the support frame 202 and can be positioned at or near the cable ports 112, 114 of the closure 100 and axially aligned with the cable ports 112, 114.

Each of the splice tray stacks 204, 206 includes a plurality of splice trays 240. In the example shown, each stack includes eight splice trays 240 for a total of sixteen splice trays 240 that are accommodated within the closure 100. Each splice tray stack 204, 206 can optionally include more or fewer splice trays 240. Each splice tray 240 is configured to support splices between first groups of fibers and second groups of fibers, e.g., between fibers of the first cable 10 and fibers of the second cable 20. Fiber slack can be routed within the interior volume 242 defined by the tray 240, and stored (typically in loops) in the area 243 of the interior volume 242 between the hinge 245 and the splice holders 244. A plurality of splice holders 244 disposed in the interior volume 242 can support the splices. Lengths of fibers can enter the splice tray from a hinged side 246, an opposing free side 248, and/or optionally from one or more other splice trays 240 via one or more openings 250 disposed in the primary support surface 252 of the tray 240. Typically, due to the placement and orientation of the cables (10, 20) entering the closure relative to the splice trays 240, the fibers from the cable (10, 20) enter and exit the one or more of the splice trays from the hinged side 246 along a direction that is substantially perpendicular to the axis of the hinge by which the tray is pivotally coupled to the tray stack.

The splice trays 240 in each splice tray stack (204, 206) are pivotally mounted at their hinged side 246 to a spine 260. In the example shown, each spine defines a plurality of stepped sockets, each socket adapted to rotationally receive a pin or other rotating hinge member to hingedly couple the splice tray 240 to the spine 260. Thus, the pin and socket for each splice tray can form a hinge adapted to pivot the splice tray relative to the spine.

Figure 5:
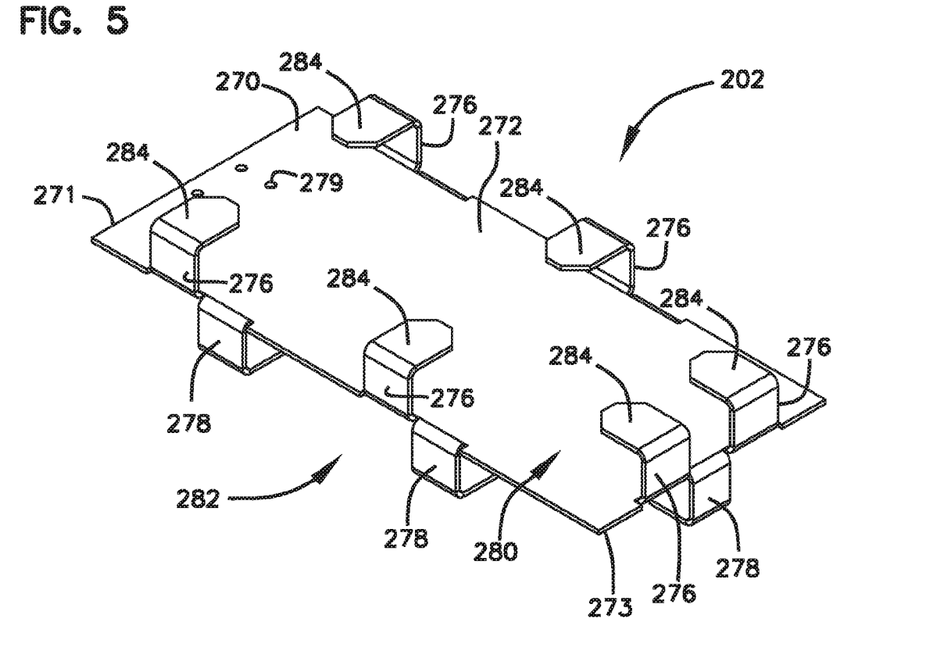
FIG. 5 is a top, rear perspective view of the example support frame of FIG. 1.
Figure 6:
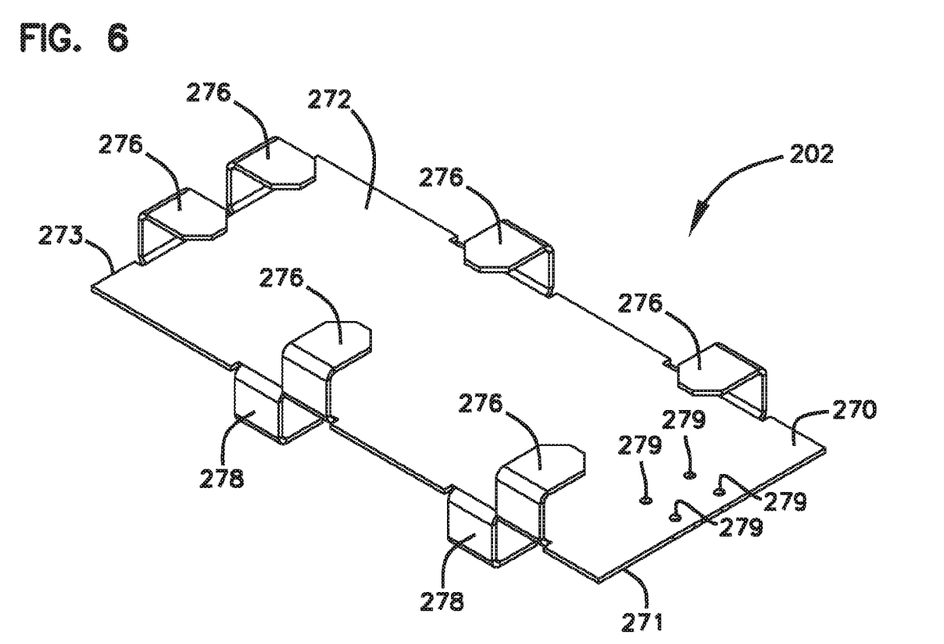
FIG. 6 is a top, front perspective view of the support frame of FIG. 1.
Figure 7:
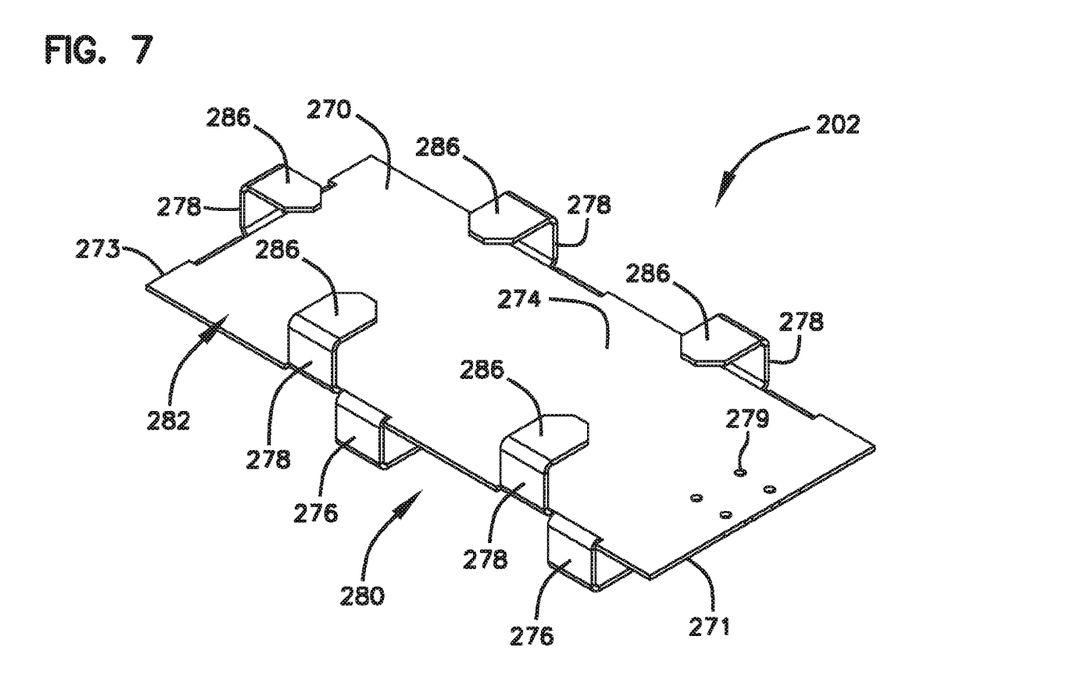
FIG. 7 is a bottom, rear perspective view of the support frame of FIG. 1.
Figure 8:
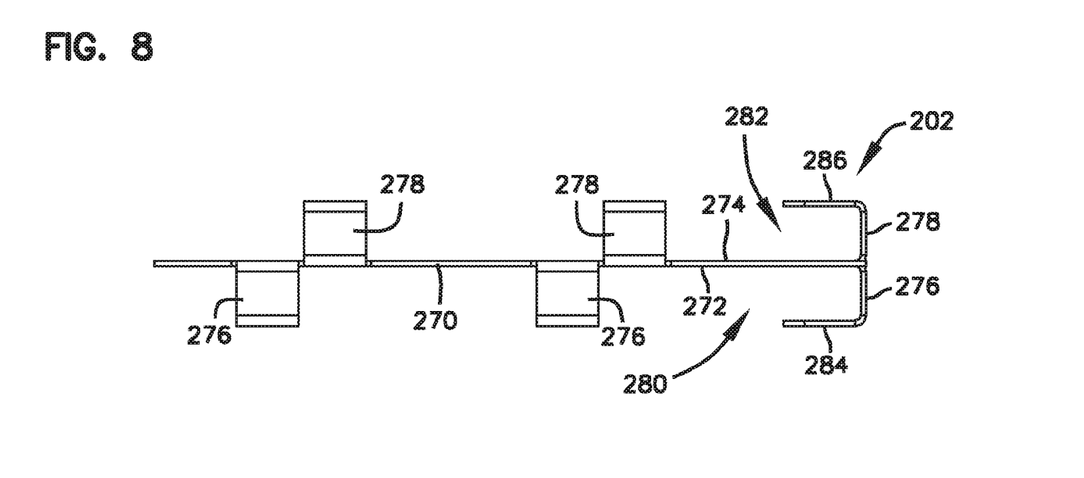
FIG. 8 is a side view of the support frame of FIG. 1.

FIG. 5 is a top, rear perspective view of the support frame 202 of FIG. 1. FIG. 6 is a top, front perspective view of the support frame 202 of FIG. 1. FIG. 7 is a bottom, rear perspective view of the support frame 202 of FIG. 1. FIG. 8 is a side view of the support frame 202 of FIG. 1.

Referring to FIGS. 5-8, the example support frame 202 includes a main plate 270 having a top surface 272 and an opposing bottom surface 274. Each of the top and bottom surfaces 272, 274 defines a plane, the planes being parallel to each other. A first plurality of legs 276 extend from the top surface 272 in a substantially upward direction, i.e., in a direction substantially perpendicular to the top surface 272 and away from the bottom surface 274. A second plurality of legs 278 extend from the bottom surface 274 of the plate 270 in a substantially downward direction, i.e., in a direction substantially perpendicular to the bottom surface and away from the top surface 272.

The plate 270 has a front 271 and a back 273. In this example, the front 271 is substantially free from legs to facilitate attachment of the attachment subassembly 220 to the plate 270. One or more through holes 279 extending through the plate 270 (between the top and bottom surfaces) can receive fasteners to secure the attachment subassembly 220 (e.g., the platform 222) to the plate 270.

The legs 276 and the top surface 272 define an upper fiber organization volume 280 above the plate 270, and between the front 271 and the back 273. The legs 278 and the bottom surface 274 define a lower fiber organization volume 282 below the plate 270, and between the front 271 and the back 273. Each of the upper and lower fiber organization volume 280, 282 can be adapted and utilized for the storage of fiber slack within the closure 100. The slack can be associated with the fibers of any of the cables entering the closure 100, i.e., on either side of a given splice supported on a splice tray within the closure. In some examples, the upper and/or lower fiber organization volume 280, 282 can be provided with one or more fiber storage or management elements, such as spools, bend radius limiters, etc. to facilitate the storage of, management and organization of fiber slack. It should be appreciated that the fiber organization volumes 280, 282 each define an area within the closure 100 where there are no splice trays.

The example support frame 202 also includes a plurality of upper feet 284 and a plurality of lower feet 286. Each of the feet 284, 286 extends from one of the legs 276, 278, each foot extending substantially parallel to the first and second surface and over/under the first and second surface. The upper feet 284 can provide a surface to support one of the splice tray stacks 204, 206. Similarly, the lower feet 286 can provide a surface to support the other of the splice tray stacks 204, 206, particularly when the splice tray stack is above the feet relative to the ground. It should be appreciated that alternative configurations other than the depicted leg and foot structures can equivalently provide for dual fiber organization volumes 280, 282 on either side of the plate 270 to support the tray stacks and also separate the tray stacks from the fiber organization volumes. For example, the tray stacks can be self-suspended via their connection to the spine 260 such they remain disposed away from the plate 270, thereby defining the fiber organization volumes 280, 282.

Figure 9:
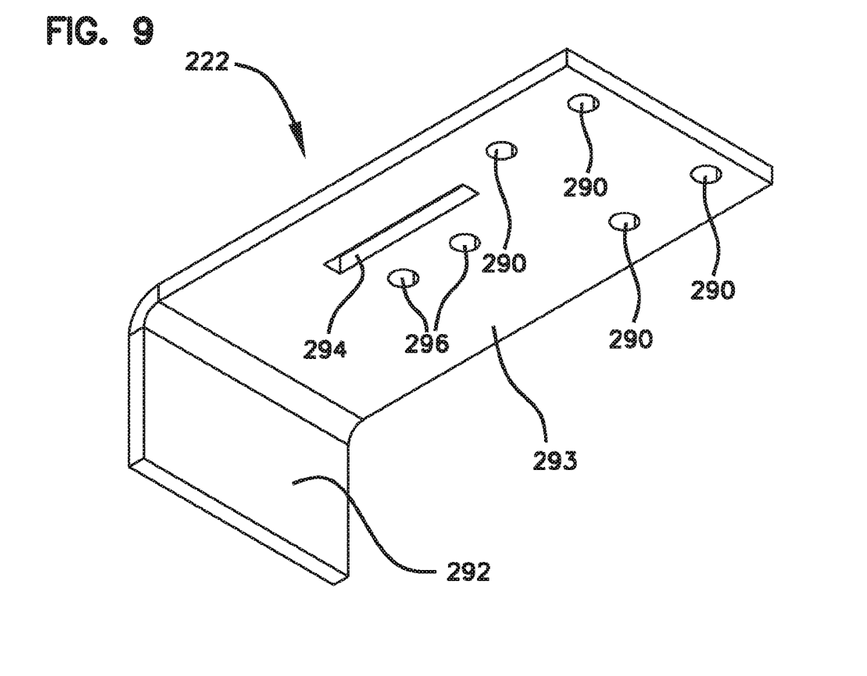
FIG. 9 is a perspective view of the platform of the attachment subassembly of FIG. 3.
Figure 10:
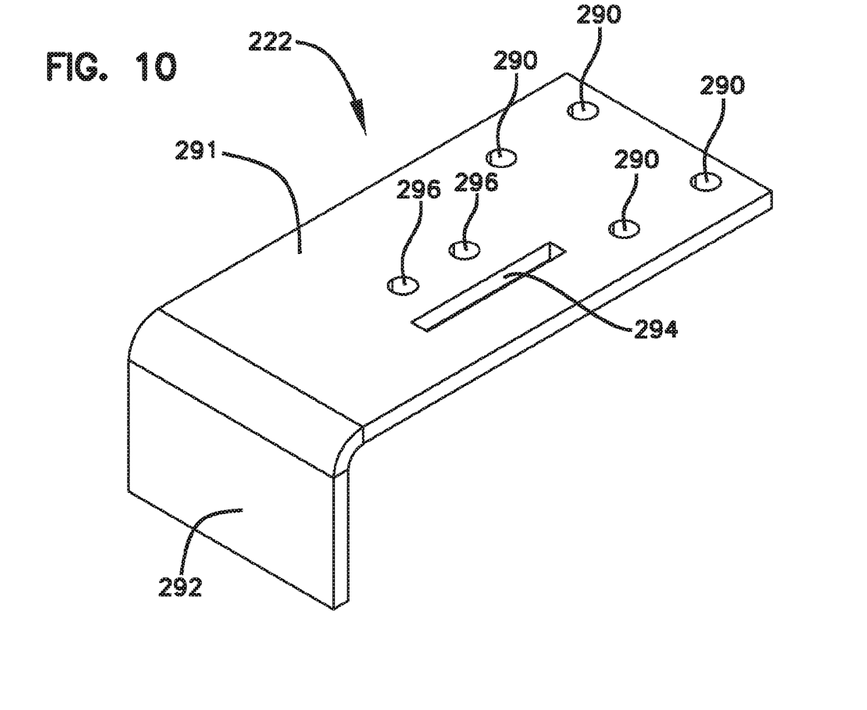
FIG. 10 is a further perspective view of the platform of the attachment subassembly of FIG. 3.
Figure 11:
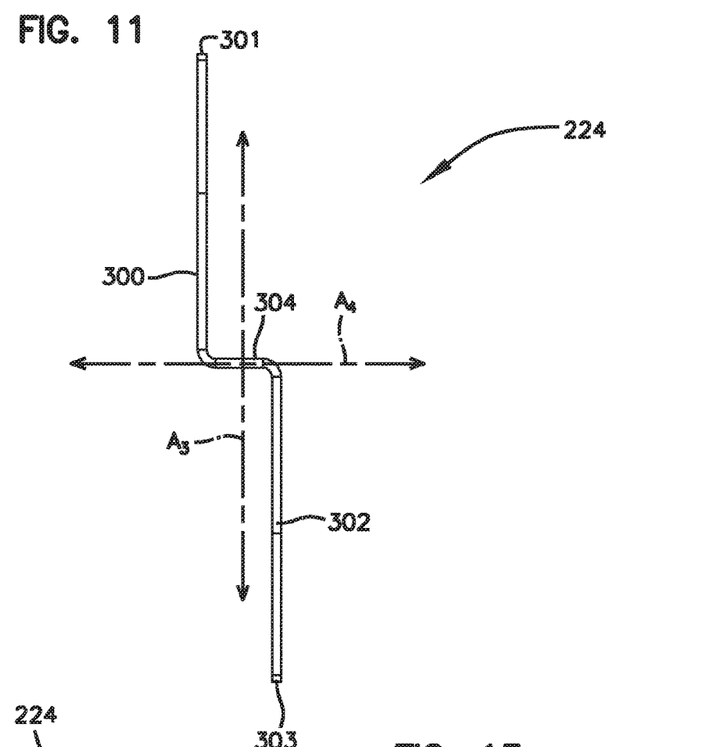
FIG. 11 is a side view of the stem of the attachment subassembly of FIG. 3.
Figure 12:
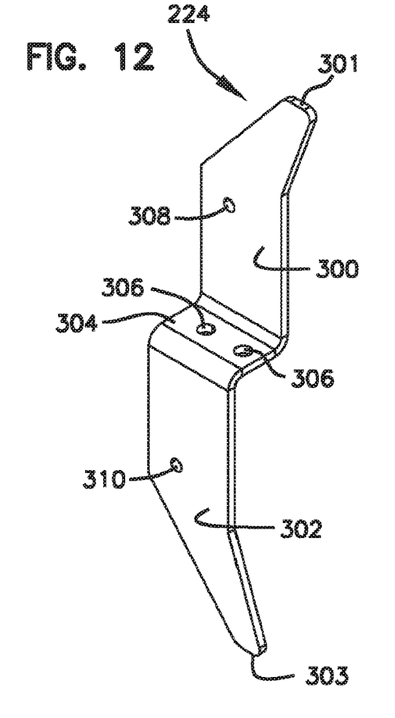
FIG. 12 is a perspective view of the stem of the attachment subassembly of FIG. 3.
Figure 13:
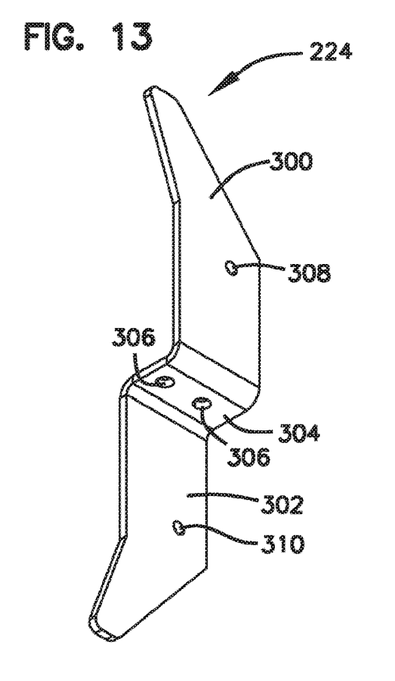
FIG. 13 is a further perspective view of the stem of the attachment subassembly of FIG. 3.

FIG. 9 is a perspective view of the platform 222 of the attachment subassembly 220 of FIG. 3. FIG. 10 is a further perspective view of the platform 222 of the attachment subassembly 220 of FIG. 3. FIG. 11 is a side view of the stem 224 of the attachment subassembly 220 of FIG. 3. FIG. 12 is a perspective view of the stem 224. FIG. 13 is a further perspective view of the stem 224.

Referring to FIGS. 9-13, in this example, the platform 222 includes an upper surface 291 and a lower surface 293. An extension piece 292 extends from the platform 222 and can be adapted to abut and/or couple to the bridge 228 described above. The platform 222 includes a plurality of through holes 290 configured to align with the through holes 279 of the support frame 202. A fastener (e.g. a bolt or screw) can be received in the through hole 290 and the corresponding through hole 279 to secure the platform 222 to the support frame 202.

The stem 224 extends between a top end 301 and a bottom end 303, and includes first and second substantially vertical portions 300 and 302 extending parallel to a vertical axis A3. The vertical portions 300 and 302 are joined to each other with a substantially horizontal portion 304 extending substantially parallel to a horizontal axis A4. The vertical portions 300 and 302 can be tapered as shown to accommodate an angled or stepped portion of a splice tray stack. Each of the vertical portions 300 and 302 includes at least one through-hole 308 adapted to receive a fastener for securing a portion of one of the splice tray stacks 204, 206. The horizontal portion 304 includes one or more through-holes 306 configured to align with corresponding through holes 296 in the platform 222. Thus, the horizontal portion 304 can be adapted to at least partially abut the platform 222.

As indicated, the example platform 222 includes features adapted to support a stem (e.g., the stem 224 of the attachment subassembly 220). In this regard, the platform 222 includes an elongated through-slot 294 configured to receive a vertically oriented portion of the stem 224 (e.g., the portion 300 or the portion 302), and one or more through-holes 296 are configured to align with corresponding through-holes 306 on the horizontally oriented portion 304 of the stem 224. The stem 224 can be secured to the platform 222 with fasteners inserted in the thorough-holes 306 and the corresponding through-holes 296.

Figures 14, 15:
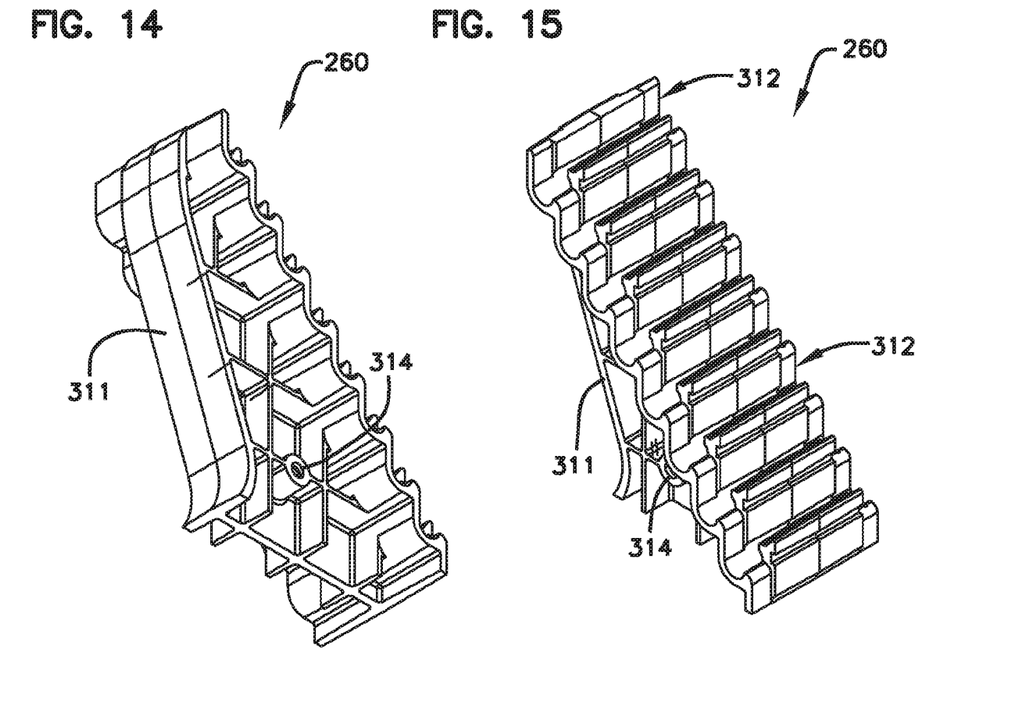
FIG. 14 is a perspective view of the spine of one of the splice tray stacks of the splice assembly of FIG. 1.
FIG. 15 is a further perspective view of the spine of FIG. 14.
Figure 16:
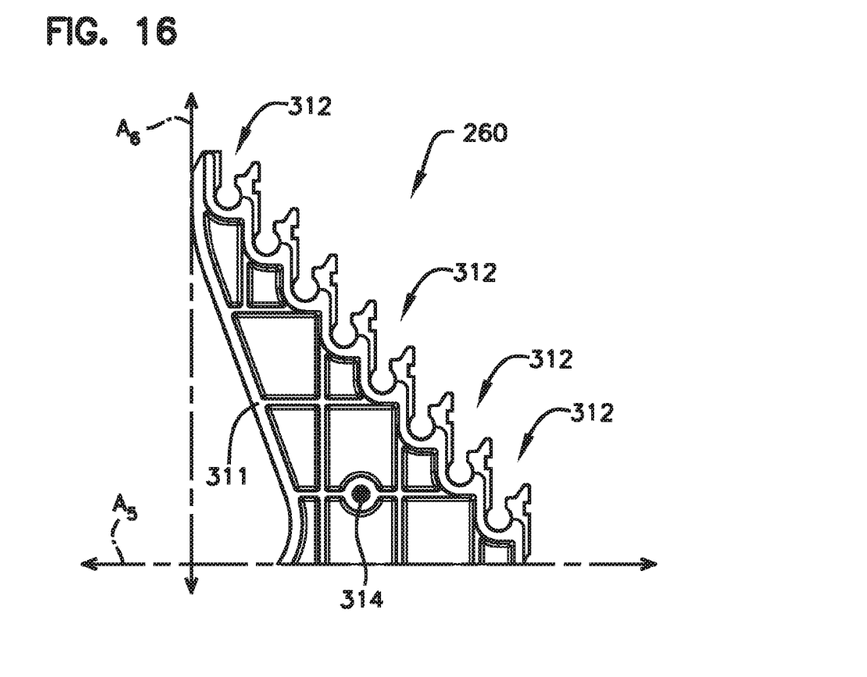
FIG. 16 is a side view of the spine of FIG. 14.

FIG. 14 is a perspective view of the spine 260 of one of the splice tray stacks 204, 206 of the splice assembly 200 of FIG. 1. FIG. 15 is a further perspective view of the spine 260 of FIG. 14. FIG. 16 is a side view of the spine 260 of FIG. 14.

Referring to FIGS. 14-16, the example spine 260 includes a support 311 and a plurality of sockets 312 arranged in a stepped configuration relative to a horizontal axis A5 and a vertical axis A6. The support 311 supports the sockets 312. In this example, the spine 260 includes eight sockets 312, though more or fewer sockets could be provided. Each socket 312 is adapted to receive and rotationally house a pin or similar component of a splice tray 240 of one of the splice tray stacks 204, 206, the pin and socket forming a hinge adapted to pivot the splice tray 240 upward relative to its corresponding socket 312. Pivoting of a splice tray 240 in this manner can provide access to another of the splice trays 240 in the same stack. A horizontally extending through-hole 314 in the spine 260 is configured to align with one of the through holes 308, 310 of the stem 224. In this manner, a fastener can be passed through the through-hole 314 and the corresponding through-hole 308, 310 to secure the spine 260 to the stem 224, and thereby to secure one of the splice tray stacks 204, 206 to the attachment subassembly 220.

Figure 17:
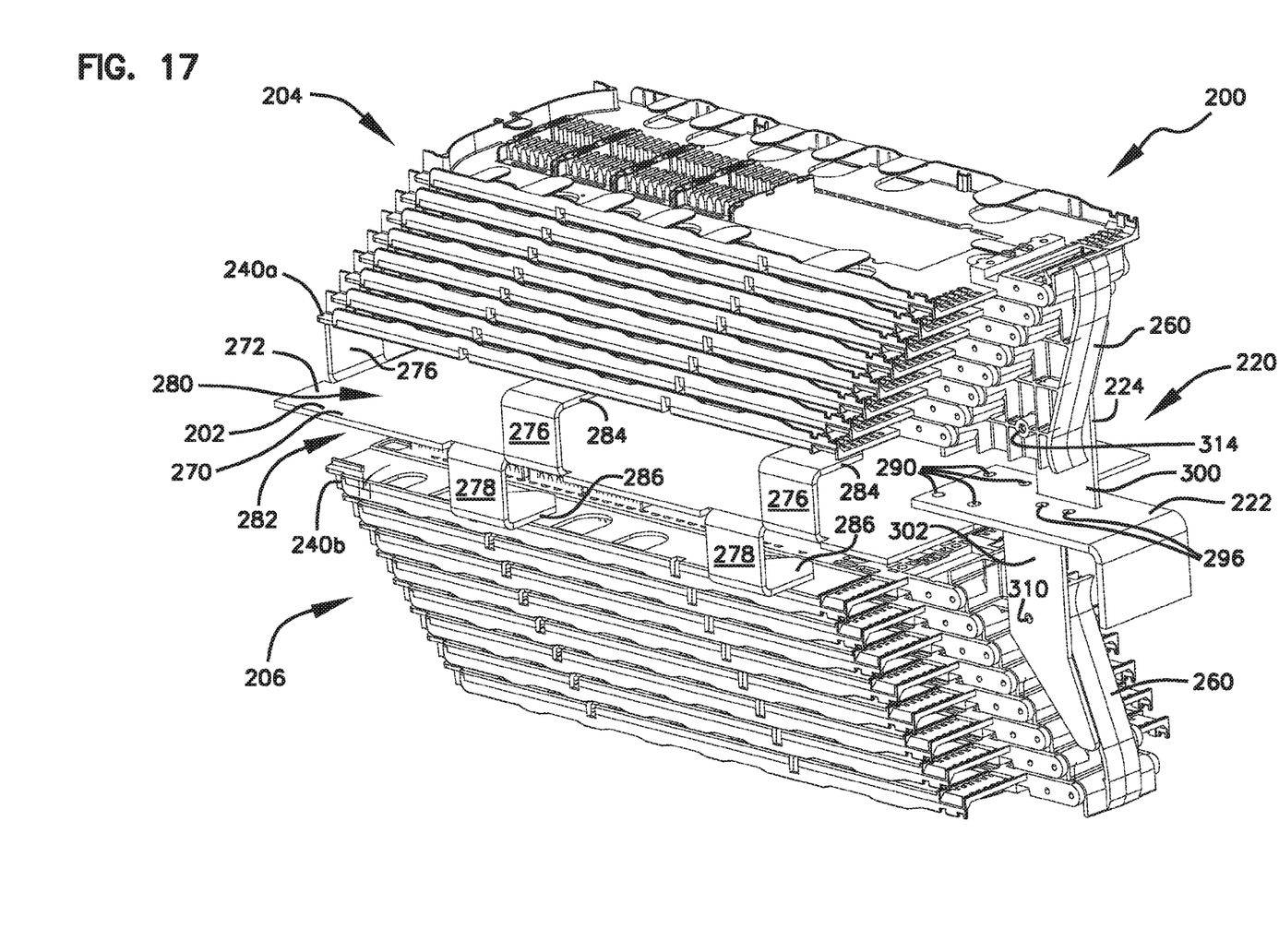
FIG. 17 is an enlarged top perspective view of the splice assembly of FIG. 1 without the trough.
Figure 18:
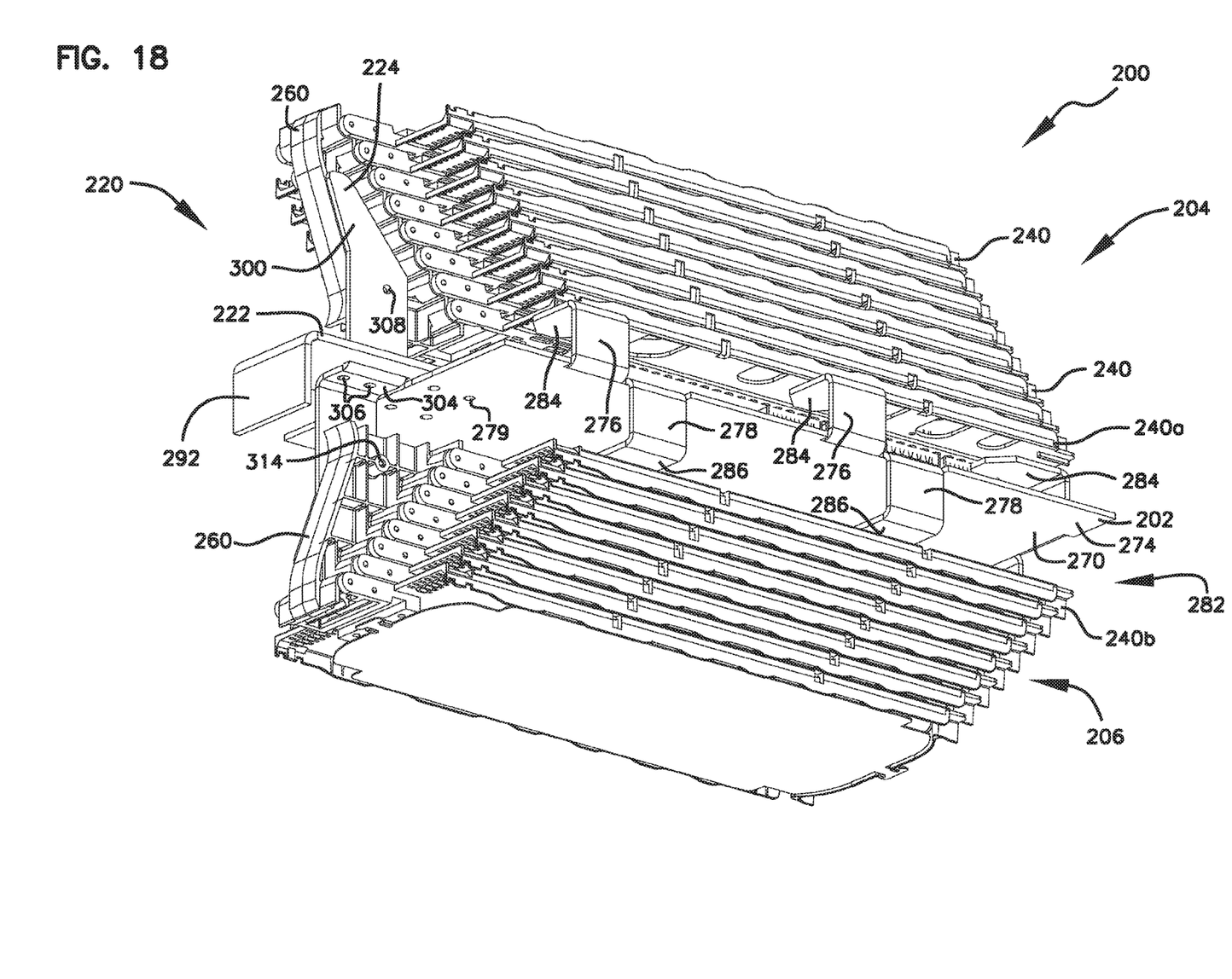
FIG. 18 is an enlarged bottom perspective view of the splice assembly of FIG. 1 without the trough.

FIG. 17 is an enlarged top perspective view of the splice assembly 200 of FIG. 1 without the trough 208. FIG. 18 is an enlarged bottom perspective view of the splice assembly 200 of FIG. 1 without the trough 208.

Referring to FIGS. 17-18, the lowermost splice tray 240*a* of the splice tray stack 204 abuts the upper surfaces of the feet 284 of the support frame 202, leaving the upper fiber organization volume 280 free and clear. Similarly, the uppermost splice tray 240*b* of the splice tray stack 206 abuts the lower surfaces of the feet 286 of the support frame 202, leaving the lower fiber organization volume 282 free and clear.

As shown in FIGS. 17-18 with respect to the attachment subassembly 220, the through-hole 314 of each spine 260 aligns with the through-hole 308 or the through hole 310 of the stem 224. The through-holes 306 on the horizontal portion 304 of the stem 224 align with the through holes 296 of the platform 222. The upper vertical portion 300 of the stem 224 is received in the elongated slot of the platform 222. The through-holes 279 of the support frame 202 align with the through holes 290 of the platform 222.

When fully assembled and fastened together, the splice assembly 200 shown in FIGS. 17-18 can provide easy access to the splice tray stack 204 for performing fiber splices on the trays 240 of the splice tray stack 204, each of the splice trays 240 in the stack 204 being pivotable relative to the spine 260 to provide access to each of the trays 240 individually. The splice assembly 200 can then be flipped or inverted relative to the horizontal (i.e., relative to the planes formed by the top and bottom surfaces 272 and 274 of the main plate 270 of the support frame 202) in order to provide pivotal access to the splice trays 240 in the splice tray stack 206. It should be appreciated that either splice stray stack 204, 206 could be provided with splices first, and the other stack second.

Referring now to FIGS. 1-3 and 17-18, a method for splicing a plurality of fibers can include one or more of the following steps, which need not be performed in the recited order: mounting a first stack 204 of splice trays 240 to the upper side of the support frame 202; mounting a second stack 206 of splice trays 240 to the lower side of the support frame 202 to provide a splice assembly; splicing a first set of fibers from the cable 10 on one or more of the splice trays 240 in the stack 206 of splice trays 240 to fibers in the cable 20; inverting the support frame 202 relative to the horizontal; splicing a second set of fibers from the cable 10 on one or more of the splice trays 240 in the stack 204 of splice trays 240 to the cable 20; loading the splice assembly containing the splices into a lower shell piece 102, 106 of the closure 100 and sealing the closure 100 with the other shell piece. In some examples, the method further includes securing the cables 10, 20 to the support frame 202.

In some examples the cable 10 includes N fibers (N being a positive integer or an even positive integer), wherein N/2 fibers are spliced on splice trays 240 of the stack 206 of splice trays and the other N/2 fibers of the N fibers are spliced on splice trays 240 of the stack 204 of splice trays. In some examples, N is at least 4,000. In some examples, N is at least 5000. In some examples, N is at least 6,000. In some examples, N is at least 6,912.

In some examples, the method further includes storing fiber slack in one or both of the upper fiber organization volume 280 and/or the lower fiber organization volume 282 defined by the support frame 202.

In some examples, the method further includes sealing the cables 10, 20 in ports 112, 114 of the closure 100. In some examples, the inverting step includes revolving the first and second cables 10, 20 about each other.

In some examples, the trough 208 can be used to facilitate transferring of the splice assembly 200 into and out of a shell piece 102, 104 of the closure 100.

Although in the foregoing description, terms such as "top," "bottom," "front," "back"/"rear," "horizontal," and "vertical" were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An assembly for a fiber optic closure, the assembly extending along an axis from a bottom of the assembly to a top of the assembly, the assembly comprising:
   a support frame, the support frame including a plate having an upper surface, an opposing lower surface, and feet positioned above the upper surface and extending parallel to the upper surface at multiple sides of the support frame, the upper surface and the feet defining a fiber organization volume above the upper surface and below the feet;
   a first spine including a socket;
   a first tray pivotally mounted to the socket of the first spine and positioned entirely above the feet; and
   a pivotally mounted second tray positioned entirely below the lower surface.

2. The assembly of claim 1, wherein the plate extends beyond edges of the first tray when the first tray rests on the feet.

3. The assembly of claim 1, wherein at least one of the first tray and the second tray is a splice tray.

4. The assembly of claim 1, wherein the first spine is connected to the support frame.

5. The assembly of claim 1,
   further comprising a second spine including a socket,
   wherein the second tray is pivotally mounted to the socket of the second spine.

6. The assembly of claim 5, wherein the second spine is connected to the support frame.

7. The assembly of claim 6, wherein each of the first spine and the second spine is connected to the support frame with an attachment subassembly.

8. The assembly of claim 7, wherein the attachment subassembly includes a platform that attaches to the support frame, and a stem that extends through a through-slot defined by the platform.

9. The assembly of claim 1, wherein the support frame defines another fiber organization volume below the lower surface.

10. The assembly of claim 9, wherein the support frame includes other feet positioned below the lower surface and extending parallel to the lower surface.

11. The assembly of claim 1, comprising a plurality of trays pivotally mounted to the first spine and positioned entirely above the feet.

12. The assembly of claim 1,
wherein the support frame includes legs extending upward from the upper surface; and
wherein the feet extend from ends of the legs.

13. The assembly of claim 9, wherein the fiber organization volume and the other fiber organization volume are back-to-back.

14. The assembly of claim 1, wherein the tray includes a pin that is pivotally received in the socket.

15. A cable closure, comprising:
shell pieces defining an interior volume; and
the assembly of claim 1 positioned in the interior volume.

16. The closure of claim 15, including at least one optical cable extending into the interior volume, the at least one optical cable including optical fibers, one of the optical fibers being looped and stored in the fiber organization volume.

17. The closure of claim 16, wherein the at least one optical cable is mounted to the support frame.

18. An assembly for a fiber optic splice closure, the assembly extending along an axis from a bottom of the assembly to a top of the assembly, the assembly comprising:
a support frame, the support frame including a plate having an upper surface, an opposing lower surface, and feet positioned above the upper surface and extending parallel to the upper surface at multiple sides of the support frame, the upper surface and the feet defining a fiber organization volume above the upper surface and below the feet;
a spine including a plurality of sockets arranged along a reference line that is oblique to the axis;
first splice trays pivotally mounted to the sockets of the spine and positioned entirely above the feet; and
a pivotally mounted second tray positioned entirely below the lower surface,
wherein the plate extends beyond edges of one of the first trays when the one of the first trays rests on the feet.

19. The assembly of claim 18, wherein the second tray is a splice tray.

* * * * *